United States Patent [19]

Wood

[11] Patent Number: 4,745,683
[45] Date of Patent: May 24, 1988

[54] APPARATUS FOR PRODUCING A POUNCE PATTERN

[75] Inventor: Kenneth O. Wood, Ellington, Conn.

[73] Assignee: Gerber Scientific Products, Inc., Manchester, Conn.

[21] Appl. No.: 59,000

[22] Filed: Jun. 8, 1987

[51] Int. Cl.⁴ .................... B43L 13/00; G01D 15/16
[52] U.S. Cl. .................................... 33/18.1; 33/18.2; 346/141
[58] Field of Search .................. 33/18.1, 18.2, 23.11; 83/30, 660, 669, 861, 866; 346/79, 100, 112, 113, 139 R, 139 C, 141

[56] References Cited

U.S. PATENT DOCUMENTS

| | | | |
|---|---|---|---|
| 4,367,588 | 1/1983 | Herbert | 33/18.1 |
| 4,426,783 | 1/1984 | Gerber et al. | 346/139 C |
| 4,467,525 | 8/1984 | Logan et al. | 33/18.2 |

Primary Examiner—Richard R. Stearns
Attorney, Agent, or Firm—McCormick, Paulding & Huber

[57] ABSTRACT

An apparatus for producing perforated pounce patterns from sheet material has a work-engaging surface for moving and supporting the sheet material. A tool carriage is supported adjacent, and movable relative to the work-engaging surface, and a tool mount is supported on the tool carriage and movable between elevated and lowered positions relative to the work-engaging surface. A pouncing tool is supported in the tool mount and has a tool shaft and a pouncing wheel rotatably suspended from the tool shaft. The pouncing wheel has a plurality of radially extending pins for forming a perforated path in the shape of a pounce pattern when engaged with the sheet material on the work-engaging surface. A keying member is engaged with the tool mount, and the tool shaft has a longitudinally extending keyway engageable with the keying member for fixing the orientation of the pouncing tool relative to the tool mount. A controller during movement of the pouncing tool relative to the sheet material along a line to be perforated rotates the tool mount so that the pouncing wheel axis of rotation is maintained at an oblique angle to the line of tangency between the wheel and the perforated line thereby producing improved perforations in the sheet material that do not tend to close after being formed.

2 Claims, 3 Drawing Sheets

APPARATUS FOR PRODUCING A POUNCE PATTERN

BACKGROUND OF THE INVENTION

The present invention relates to a microprocessor based apparatus for use in producing perforated pounce patterns in sheet material for use in painting signs and the like, and deals more particularly with such an apparatus for forming improved perforations in the sheet material.

Apparatus for pouncing or perforating sheet materials to form perforated patterns in the shape of sign characters are known in the art. Pouncing is sometimes employed by signmakers for dusting the outline of letters or other characters onto a sign board or other surface to display a sign. The sign surface is covered with an appropriately perforated sheet material overlay and then dabbed with a dusting pad or bag to deposit slight traces of dust through the perforations and onto the surface to form a dusted outline of the sign characters to be displayed. The signmaker then uses the dusted outline as a guide for painting the sign.

U.S. Pat. No. 4,467,525 describes a microprocessor-based apparatus used for pouncing or perforating materials along the profiles of sign characters. In this patent, the apparatus disclosed comprises a rotatable feed and backup roller having a work-engaging surface for both supporting the sheet material and for moving it back and forth. A tool carriage is supported adjacent the feed and backup roller and is moveable in a direction parallel to the roller axis, and a tool receiver is mounted on the tool carriage. This receiver is rotatable in a $\theta$-coordinate direction about an axis extending generally radially of the roller axis and is movable generally along such axis in a Z-coordinate direction between elevated and lowered positions relative to the roller. A tool is releasably fixed in the tool receiver and is movable with it.

A pouncing tool may be the one fixed in the tool receiver and includes a pouncing wheel with a plurality of radially extending teeth or punch pins rotatably connected to the lower end of a support member for rotation relative to the support member about the central axis of the wheel. The punch pins are substantially needle-like in shape for perforating the sheet material. A microprocessor based controller controls the positioning of the tool carriage relative to the roller in an X-coordinate direction extending along the length of the roller, the feed of the sheet material in a Y-coordinate direction by rotation of the feed and backup roller, and the movement of the receiver in the $\theta$ and Z-coordinate directions.

During a perforating operation, the controller is operated to move the tool carriage to a selected position and to move the pouncing tool to a lowered position for placing the punch pins into working engagement with the sheet material supported on the roller. The controller then operates to cause movement of the pouncing tool along one or more lines on the sheet material to form one or more perforated paths conforming to the profiles of selected sign characters.

A problem associated with the use of the above-described apparatus is that the perforations formed by the needle-like punch pins are small and generally circular in shape. As a result, the portions of sheet material pushed away to form the individual perforations tend to move back over and close the perforations prior to or when the pounce pattern is placed over the surface to be painted. Therefore, when the pattern is dusted, the outline formed may be incomplete or indistinct in sections where the perforations become closed or nearly closed. The painter may then use a hand held needle or similar instrument to individually reopen each of the closed perforations and redust the outline on the sign surface to be painted. As a result, the use of a pounce pattern to form a dusted outline may become a tedious process.

It is accordingly an object of the present invention to provide an improved apparatus for producing a pounce pattern that overcomes the drawbacks and disadvantages of known pounce pattern producing apparatus.

SUMMARY OF THE INVENTION

In accordance with the present invention, an improved apparatus of the aforementioned general type is provided for producing perforated pounce patterns from sheet material for use in painting signs and the like. The improvement and invention resides in a means for orienting and maintaining the axis of pouncing wheel rotation relative to its support member in an oblique relation to the perforated path as the path is followed. As a result of this configuration improved perforations are formed that are generally irregular in shape and do not tend to close after they are formed.

DESCRIPTION OF PREFERRED EMBODIMENT

Figure 1:
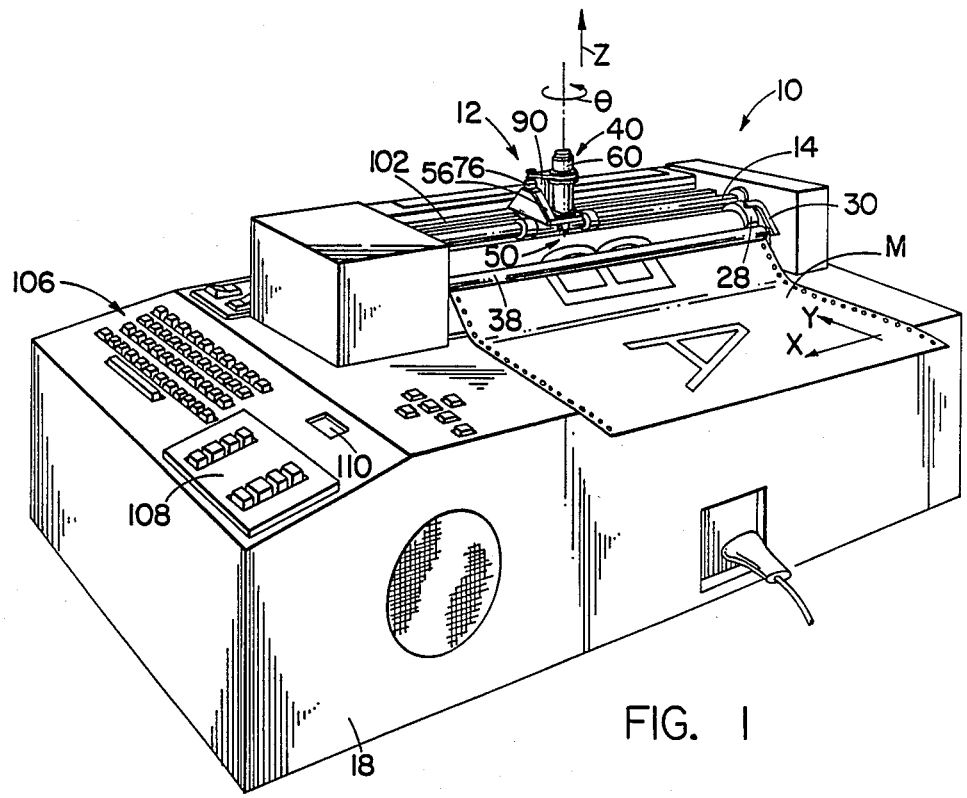
FIG. 1 is a perspective view illustrating a microprocessor based apparatus for producing pounce patterns in sheet material and embodying the invention.

Turning to the drawings, FIG. 1 illustrates an apparatus, indicated 10, for producing pounce patterns in sheet material for use in painting signs and the like. The apparatus 10 is known in the art, and is an integrated machine capable of utilizing various tools to perform different operations on various types of sheet material. The apparatus 10 is adaptable to accept various types of tools, such as cutting tools to cut lines of text or other graphics on a sheet material, writing tools to draw lines on sheet material, or pouncing tools to produce perforated lines in sheet material. The apparatus 10 includes both controls for the mechanical components and a microprocessor for composing lines of text or other graphics and for executing a related routine such as that causing a pouncing tool when installed in the tool receiver to make a corresponding pounce pattern.

Figure 2:
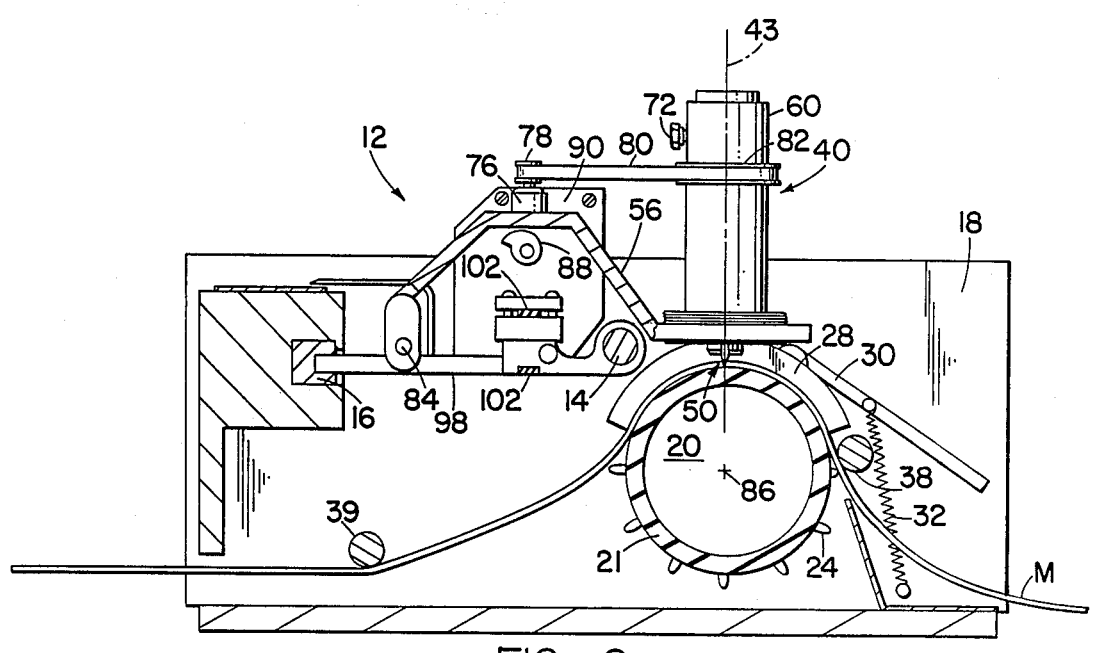
FIG. 2 is a partial cross sectional view showing the tool head and sheet material feeding mechanism of FIG. 1.
Figure 3:
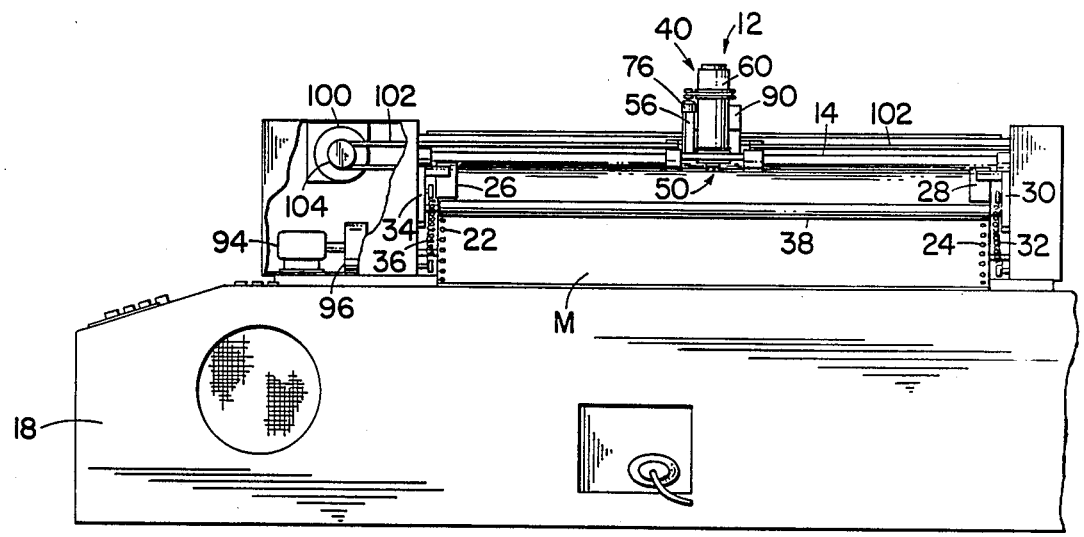
FIG. 3 is a front elevation view of the apparatus of FIG. 1.

In a preferred embodiment, the apparatus 10 is utilized to produce a perforated pounce pattern and has a tool head 12 mounted on a pair of horizontal guideways 14, 16, fixed relative to the housing 18 of the apparatus, for movement transversely of a sheet of pounce pattern material M. The material M may be, and preferably is, a paper of the type known for use in producing pounce patterns. As shown in FIG. 2, the apparatus 10 further comprises a feed and backup roller 20 mounted for rotation relative to the housing 18 about a horizontal axis. The roller has an outer sleeve 21 defining a support or backup surface underlying the sheet material M. The roller also has sprockets 22, 24 at its opposite ends, as shown in FIG. 3, for engaging corresponding sprocket holes in the sheet material M to positively drive the sheet material in the Y-coordinate direction as the roller is rotated.

To ensure that the feed sprockets 22, 24 and the holes in the sheet material remain in engagement over a substantial segment of the sprockets, the apparatus 10 includes arcuately shaped guide clamps 26, 28, each having an arcuate groove straddling the sprocket pins, which are resiliently biased downwardly against the sheet material at each end of the roller 20. As shown in FIG. 2, the clamp 28 is pivotally joined to a support arm 30 in turn pivotally movable relative to the housing 18 and resiliently biased downwardly by a tensioning spring 32. The opposite clamp 26 is similarly mounted and drawn downwardly against the sheet material by means of a support arm 34 and spring 36 as shown in FIG. 3. A guide bar 38 of the apparatus extends in front of the feed roller 20 in parallel relationship with the roller to additionally hold the sheet material and guide the material on and off the feed roller as a perforating operation takes place. A similar guide bar 39 is located behind the feed roller as shown in FIG. 2 for the same purpose. The sheet material M can be fed through the apparatus 10 in sheets or from supply rolls of material at each side of the apparatus.

Turning now to the invention in greater detail, the apparatus 10 uses a pouncing tool 40 installed in the tool receiver of the tool head 12 for producing a pouncing pattern in the sheet material M. Coordinated movements of the tool head 12 relative to the sheet material M in the X, Y, Z and θ-coordinate directions enable two dimensional perforated characters or other graphics to be created in the material M.

Figure 5:
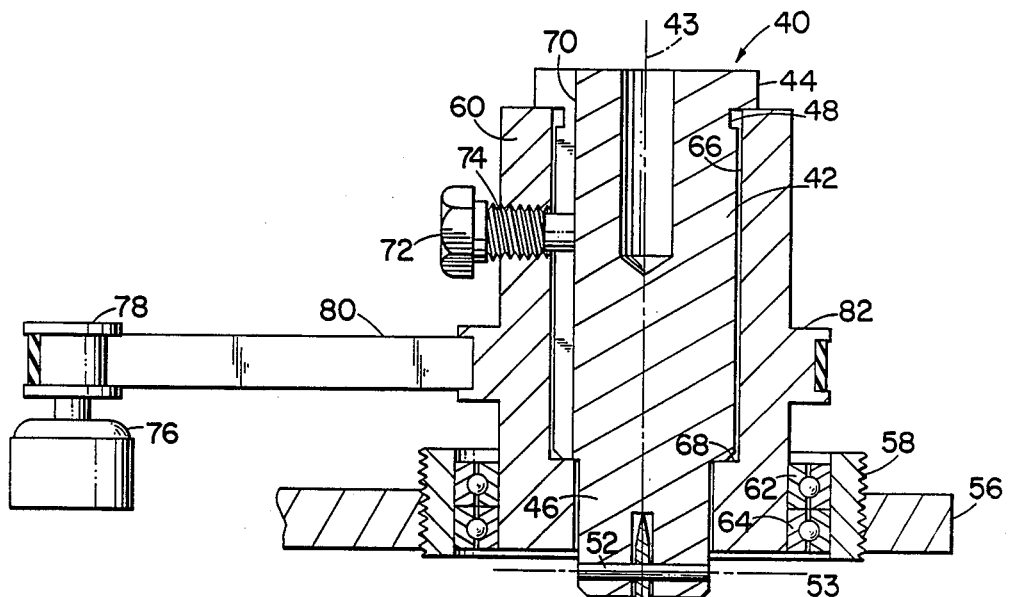
FIG. 5 is a side elevation view partially in section illustrating the pouncing tool of the apparatus of FIG. 1.
Figure 6:
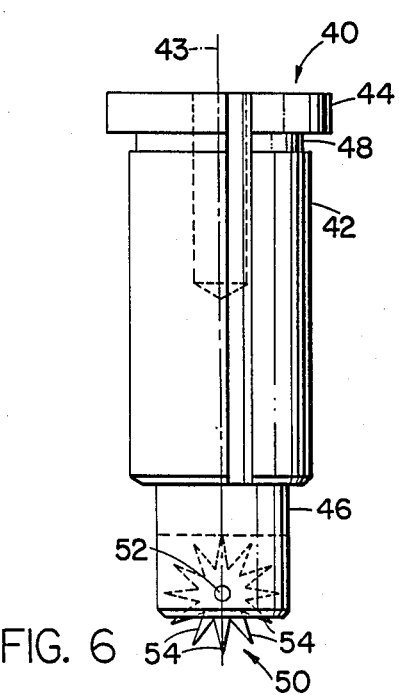
FIG. 6 is a side elevation view of the pouncing tool of FIG. 1 illustrated in greater detail.
Figure 7:
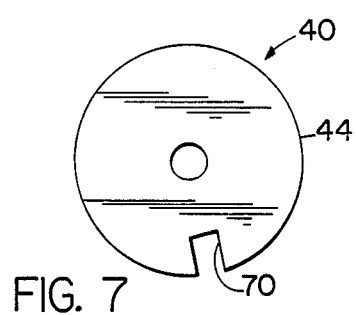
FIG. 7 is a top elevation view of the pouncing tool of FIG. 1.

The pouncing tool 40, as shown in FIGS. 5-7 in greater detail, includes a cylindrical holder or support member 42 having a central axis 43 and a cylindrical flange 44 and groove 48 at its upper end. The lower end portion of the holder 42 is slotted to provide a yoke 46. The tool 40 also includes a pouncing wheel 50 located in the slot and mounted by an axle 52 to the yoke 46 for rotation about a horizontal axis 53 perpendicular to the holder's central axis 43. The wheel 50 has a plurality of substantially equally angularly spaced radially extending, generally needle shaped, teeth or punch pins 54, 54 for perforating the sheet material M when the wheel is lowered into rolling engagement with the roller 20 during a perforating operation.

The pouncing tool 40 is mounted in a receiver 60 located on the free end of a support arm 56. The receiver in turn is rotatable, through bearing units 62, 64 within a bushing 58 of the tool head 12, about an axis colinear with the central axis 43 of the holder. The tool receiver 60 has a cylindrical bore 66 for slidably receiving the tool holder 42 and a seat 68 at its lower end to support the tool 40 in the vertical direction. As shown in FIG. 5, when the tool 40 is seated in the receiver 60 the yoke 46 extends through the lower end of the receiver to permit the pounce wheel 50 to rotate and freely engage the sheet material M.

The tool holder 42 has a keyway 70 extending along its length and through the flange 44. A clamping and keying screw 72 engages the keyway 70 through a threaded hole 74 in a side wall of the receiver to fix angularly and axially the tool to the tool receiver. An angular orientation or θ-axis motor 76 is connected to the receiver 60 by means of a toothed drive pulley 78 on the motor, a toothed pulley 82 on the receiver, and a toothed belt 80 trained over the two pulleys 78 and 82. The motor 76 operates in response to command signals from the mircoprocessor, not shown, to rotate the receiver 60 to control the orientation of the pouncing wheel axis 53 about the axis 43 during a perforating operation.

Figure 8:
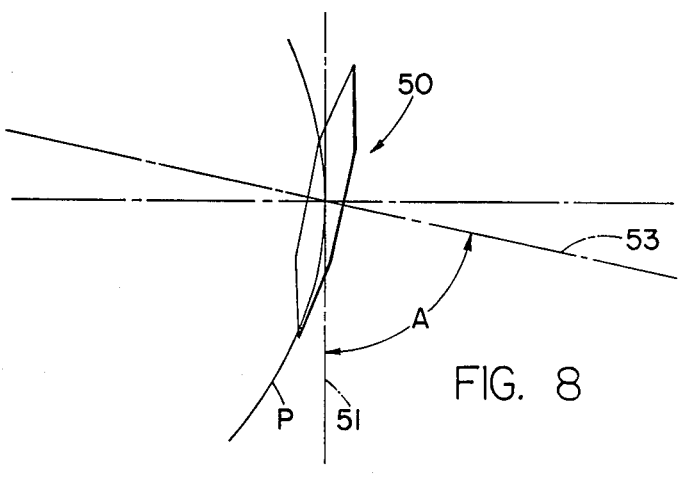
FIG. 8 is a top view of the pouncing wheel of FIG. 1 showing the angular orientation of the pouncing wheel rotational axis relative to a perforated path.

In accordance with the invention, the keyway 70 is arranged so that it, in cooperation with the control program, maintains the pouncing wheel axis 53 in an oblique relation to a perforated path P as the path is formed or followed, as shown in FIG. 8. That is, the plane in which the wheel rotates, instead of being maintained generally tangent to the travel line as in the past, is orientated at an angle A to the line of tangency. This configuration results in the formation of perforations in the sheet material that are not perfectly circular, but which instead have a generally irregular shape and as a result do not tend to close after they are formed. This is due to the fact that each tooth of the wheel as it passes through a phase of engagement with the material M does not merely pierce the material, but also moves slightly relative to the material in the plane of the material and therefore tends to create ragged tears in the material. It has been found that when the wheel axis 53 is maintained at an angle A of between 95° and 110° relative to the line 51 tangent to the path P, the resulting perforations are of particularly desirable quality. However, the specific angular relation may vary from the above-mentioned range depending upon the characteristics of the pouncing tool 40 and the sheet material M.

Figure 9:
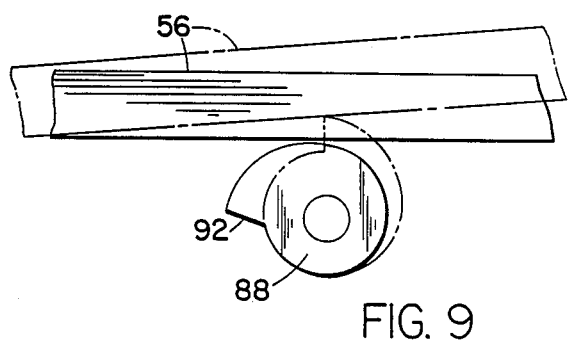
FIG. 9 is a fragmentary view showing the support arm and the associated lifting cam for the tool receiver of the apparatus of FIG. 1.

The support arm 56 is connected to the rear portion of the tool head 12 by means of a hinge pin 84 extending parallel to the roller 20, as shown in FIG. 2. The arm 56 supports the tool 40 with the tool axis 43 extending in intersecting relationship with the axis 86 of rotation of the feed roller 20. A bridging portion of the arm 56 passes over a rotary lifting cam 88, and the cam is rotated by means of a lifting motor 90 to raise and lower the pouncing wheel 50 into and out of engagement with the sheet material M. As shown in FIG. 9 the cam 88 has a lifting lobe 92, which is rotated from the solid line position to the phantom position to lift the arm 56 and therefore the pouncing wheel 50 away from engagement with the sheet material.

The feed roller 20 is rotatably driven by a servo motor 94 shown in FIG. 3. The motor is connected in driving relationship with the roller through a gear reduction unit 96 and is actuated in response to command signals from a microprocessor, not shown, to move the sheet material M back and forth under the pouncing tool 40.

Figure 4:
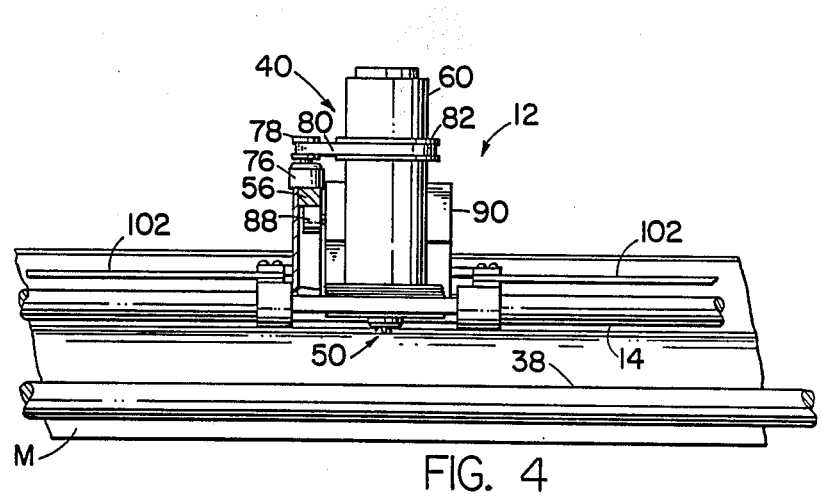
FIG. 4 is a fragmentary front elevation view of the tool head and the material feeding mechanism of the apparatus of FIG. 1 shown at an enlarged scale.

The tool head 12 is part of a tool carriage 98, as shown in FIG. 2, that is moved back and forth on the ways 14, 16 by means of another servomotor 100 and a tool head drive belt 102 threaded around pulleys 104 (only one shown) at opposite ends of the ways. The one end of the drive belt connects with the tool carriage at one side and the other end of the belt connects with the carriage at the opposite side, as shown in FIG. 4. The servomotor 100 moves the tool head 40 back and forth relative to the sheet material and feed roller in response to command signals from the microprocessor, not shown. Additionally, the lift motor 90 receives command signals to move the tool, and therefore the pouncing wheel 50 into and out of engagement with the material in conjunction with the controlled displacements produced by the servomotors, 94, 100. Control cables for the lift motor 90 are preferably in the form of a ribbon wire which may roll and unroll in a trough supported adjacent the head 12 as the head moves back and forth over the feed roller 20.

The apparatus 10 has a data keyboard 106 for entering data into the microprocessor, not shown, defining the pounce pattern to be perforated. Additionally, a function control keyboard 108 of the apparatus is provided for controlling data entry and machine operations and a visual display 110 is provided for viewing the characters to be perforated. The programming and control of the microprocessor of the apparatus 10 are known, and are described in detail in the patent to Logan et al, U.S. Pat. No. 4,467,525, issued on Aug. 28, 1984, and assigned to the assignee of the present invention, and which is hereby adopted as part of the present disclosure.

While the present invention has been described in a preferred embodiment, it will be understood that numerous modifications and substitutions can be had to the specific structure disclosed without departing from the spirit of the invention. Accordingly, the present invention has been described in a preferred embodiment by way of illustration rather than limitation.

What is claimed:

1. An apparatus for perforating sheet material to produce a pouncing pattern for use, for example, in painting signs, said apparatus comprising:

means providing a surface for supporting sheet material;

a pouncing wheel having an axis of rotation and a plurality of angularly spaced radially extending pointed teeth, and means for moving said pouncing wheel and the sheet material supported by said surface relative to one another so that said pouncing wheel moves along a desired path on said sheet material and rotates about said axis of rotation due to rolling engagement of its teeth with said material, said means operating to maintain said axis of wheel rotation at an acute angle to the tangent line of said path at the point on said path at which said wheel is momentarily positioned.

2. An apparatus for perforating a pounce pattern in sheet material according to claim 1 wherein said means for moving said pouncing wheel and sheet material relative to one another maintains said axis of wheel rotation at an angle of between 95° and 110° relative to said tangent line.

* * * * *